United States Patent [19]

Suzuki

[11] Patent Number: 5,185,869
[45] Date of Patent: Feb. 9, 1993

[54] SYSTEM FOR MASKING EXECUTION READY SIGNAL DURING UNSETTLED PERIOD OF DETERMINING BRANCH CONDITION TO PREVENT READING OUT OF STORED INSTRUCTIONS

[75] Inventor: Nariko Suzuki, Tokyo, Japan

[73] Assignee: NEC Corporation, Tokyo, Japan

[21] Appl. No.: 474,263

[22] Filed: Feb. 5, 1990

[30] Foreign Application Priority Data

Feb. 3, 1989 [JP] Japan ................................ 1-24864

[51] Int. Cl.$^5$ .............................................. G06F 13/00
[52] U.S. Cl. ........................... 395/375; 364/231.8; 364/261.3; 364/261.5; 364/261.8; 364/DIG. 1; 364/948.34; 364/938; 364/938.1; 395/800
[58] Field of Search ... 364/200 MS File, 900 MS File; 395/800 MS File, 375

[56] References Cited

U.S. PATENT DOCUMENTS

| | | |
|---|---|---|
| 3,736,567 | 5/1973 | Lotan et al. .................... 340/172.5 |
| 4,200,927 | 4/1980 | Hughes et al. .................. 364/200 |
| 4,298,927 | 11/1981 | Boglund et al. ................. 364/200 |
| 4,409,654 | 10/1983 | Wada et al. .................... 364/200 |
| 4,742,451 | 5/1988 | Bruckert et al. ................ 364/200 |
| 4,847,753 | 7/1989 | Matsuo et al. .................. 364/200 |
| 4,853,840 | 8/1989 | Shibuya ........................ 364/200 |
| 4,881,194 | 11/1989 | Sprague et al. ................. 364/900 |
| 4,942,525 | 7/1990 | Shintani et al. ................ 364/200 |
| 4,984,154 | 1/1991 | Hanatani et al. ................ 364/200 |

Primary Examiner—Thomas C. Lee
Assistant Examiner—Meng-Ai T. An
Attorney, Agent, or Firm—Foley & Lardner

[57] ABSTRACT

An improved microprocessor in which distribance of a pipeline processing flow caused by a conditional branch instruction is suppressed. The microprocessor includes an instruction decoder unit having a precedent decoding function in which at least one instruction subsequent to a conditional branch instruction or an instruction at a branch destination address is decoded in advance during a branch condition unsettled period. A register queue temporarily stores the decoded instructions and a mask control unit responds to the decoder unit by masking a ready state for execution of at least one decoded instruction.

14 Claims, 8 Drawing Sheets

SYSTEM FOR MASKING EXECUTION READY SIGNAL DURING UNSETTLED PERIOD OF DETERMINING BRANCH CONDITION TO PREVENT READING OUT OF STORED INSTRUCTIONS

BACKGROUND OF THE INVENTION

The present invention relates to a pipeline microprocessor and, more particularly, to an improvement in an instruction decoder unit in a pipeline microprocessor.

In a pipeline microprocessor, respective units, such as an instruction prefetch unit for prefetching an instruction, an instruction decoder unit (IDU) for decoding the prefetched instruction, a memory management unit for calculating an effective address of operand data in response to operand access information from IDU and an execution unit (EXU) for executing the instruction in accordance with decoded instruction information from IDU, perform an individually allocated operation in accordance with a predetermine pipeline flow. IDU is thus decoding an instruction which is a few steps late with respect to an instruction being currently executed by EXU, in general.

A conditional branch instruction is often written in a string of instructions to be executed and is employed to control an instruction stream to be executed according to whether or not a branch condition designated by the conditional branch instruction is satisfied under the content of a program status word controlled by the result and/or state of the instruction executed by EXU. When IDU decodes the conditional branch instruction, it detects the branch condition designated by that instruction. However, if the instruction currently being executed by the EXU and/or a non-executed instruction or instructions between the currently executed instruction and the conditional branch instruction could change the content of the program status word, the branch condition is not settled until EXU completes the execution of such instruction(s).

Therefore, a construction is generally adopted that when IDU decodes the conditional branch instruction it stops to decode subsequent instructions until the branch condition is settled. This means, however, that the pipeline processing flow is suspended effecting the processing-speed of the microprocessor, i.e., the conditional branch instruction disturbs the pipeline processing flow of the microprocessor.

SUMMARY OF THE INVENTION

Therefore, an object of the present invention is to provide an improved microprocessor in which the disturbance of a pipeline processing flow caused by a conditional branch instruction is suppressed.

Another object of the present invention is to provide a microprocessor including an instruction dedoder unit having a precedent-decoding function in which at least one instruction subsequent to a conditional branch instruction or an instruction at a branch destination address is decoded, in advance, during a branch condition unsettled period.

A microprocessor according to the present invention comprises a decoder for decoding an instruction supplied thereto and for producing a decoded instruction, a register queue for temporarily storing the decoded instruction, a read control circuit for reading out the decoded instruction from the register queue when it is brought into a ready state for execution, an execution unit for receiving and executing the read-out decoded instruction, a mask control circuit for responding to information indicating that a conditional branch instruction is decoded by the decoder and for masking a ready state for execution of at least one instruction which is decoded by the decoder and stored in the register queue during an unsettled period of a branch condition designated by the conditional branch instruction, and a control unit for responding to branch success or branch failure determined under a settled branch condition and for removing the mask of the ready state for execution or for changing the ready state for execution into an invalid state, the instruction whose ready state for execution is changed to the invalid state being thus deleted from the register queue and not executed by the execution unit.

Thus, the decoder continues to decode an instruction even after the conditional branch instruction is decoded. However, the ready state for execution of the instruction, which is decoded during the unsettled period of the branch condition, is masked until the branch condition is settled. In response to the branch success or branch failure determined under the settled branch condition, the ready state for execution is finally controlled. The pipeline processing flow is thereby stopped or disturbed even after the conditional branch instruction is decoded.

BRIEF DESCRIPTION OF THE DRAWINGS

The above and other objects, advantages and features of the present invention will be more apparant from the following description taken in conjunction with the accompanying drawings, in which.

DETAILED DESCRIPTION OF THE EMBODIMENTS

Figure 1:
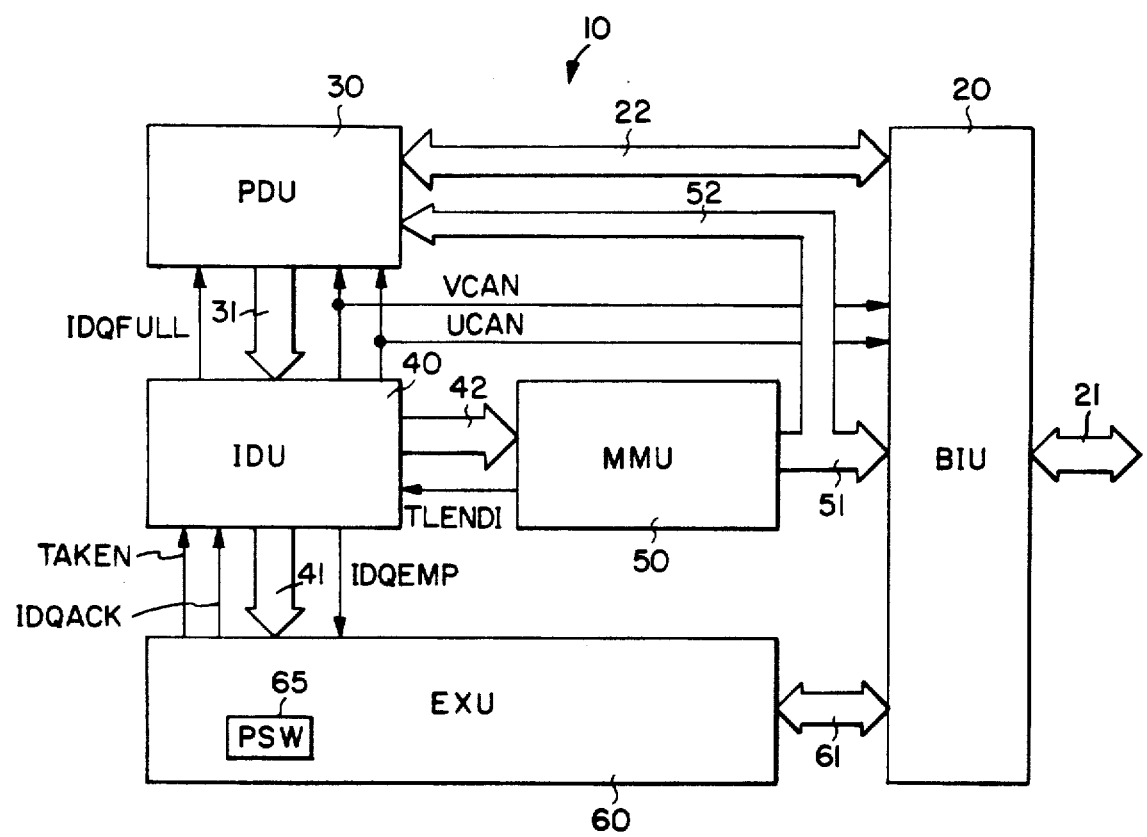
FIG. 1 is a block diagram representative of an embodiment of the present invention.

Referring to FIG. 1, a microprocessor 10 according to an embodiment of the present invention includes a bus interface unit (BIU) 20 which performs operand data read/write operations via a system bus 21 with respect to a memory and peripheral I/O devices (not shown). A prefetch/predecode control unit (PDU) 30 communicates with BIU 20 via a bus 22 to perform an instruction prefetch operation. PDU 30 temporarily stores the prefetched instruction stream and predecodes it facilitating decoding by an instruction decoder unit (IDU) 40. Namely, PDU 30 divides the instruction stream into an operation code, addressing mode information, data and so forth, and transfers them to IDU 40 via a bus 31 as an instruction code. IDU 40 decodes this instruction code and supplies via a bus 42, a memory management unit (MMU) 50 with address information necessary for calculating an effective operand address. IDU 40 further supplies via a bus 41 an execution unit (EXU) 60 with a decoded instruction processing code having arithmetic/logic operation designation information, operand location information and general register, memory or other I/O device information and so forth. MMU 50 calculates the effective address of operand data in response to the address information from IDU 40, translates it into a real address and issues an operand access request to BIU 20. When MMU 50 receives branch address information from IDU 40, it supplies a branch address to PDU 30 via a bus 52. MMU 50 supplies a TLENDI signal to IDU 40 to indicate that the address calculation and translation is completed. EXU 60 communicates with BIU 20 via a bus 61 in response to the decoded instruction processing code from IDU 40 and starts to execute the instruction at a time when operand data are ready. IDU 40 includes a plurality of queue registers (FIG. 2) each for temporarily storing the decoded instruction processing code IDU 40 supplies an IDQFULL signal to PDU 30 when all the queue registers store non-executed decoded instruction code. PDU 30 thereby suspends transferring the instruction code to IDU 40. When all the queue registers are brought into an empty state, IDU 40 supplies an IDQEMP signal to EXU 60 to suspend the instruction execution by EXU 60. When EXU 60 fetches the decoded instruction code, it returns an IDQACK signal to IDU 40. EXU 60 includes a program status word register (PSW) 65, the content of which is controlled and changed by the result and/or state of the executed instruction, and judges whether or not the branch condition designated by a conditional branch instruction supplied from IDU 40 is satisfied with reference to the content of PSW 65. The judging result is transferred to IDU 40 as a TAKEN signal. In response to this signal, IDU 40 generates a VCAN signal in case of branch success (i.e., the branch condition being satisfied) and a UCAN signal in case of branch failure (i.e., the branch condition not being satisfied). These signals VCAN and UCAN are supplied to PDU 30 and BIU 20 indicating branch success or failure. BIU 20, PDU 30, IDU 40, MMU 50 and EXU 60 operate in a pipeline manner and thus perform an individually allocated operation in parallel to one another.

Figure 2:
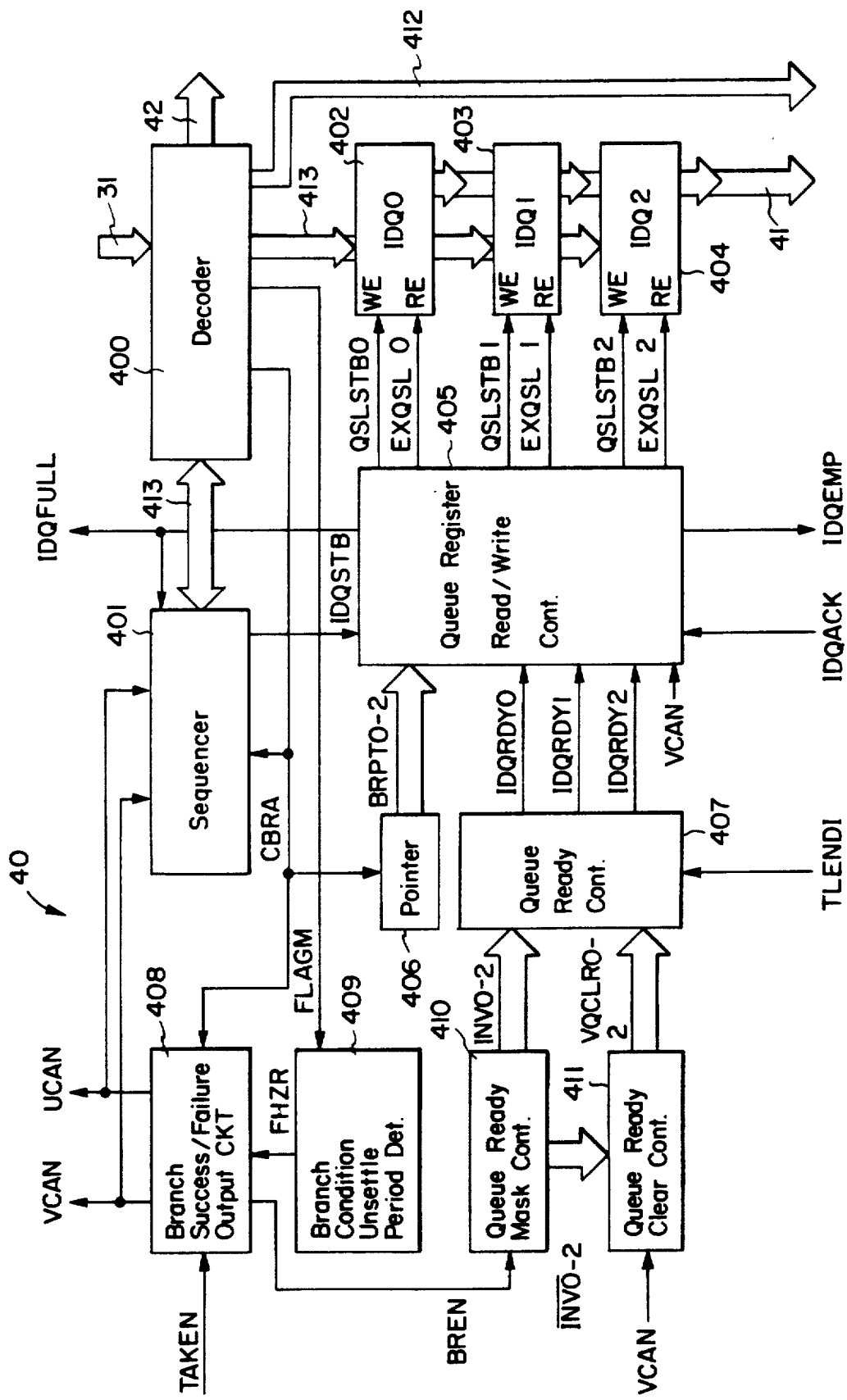
FIG. 2 is a block diagram representative of an instruction decoder unit (IDU) shown in FIG. 1.

Referring to FIG. 2, IDU 40 includes a decoder 400 decoding an instruction code supplied via the bus 31 from PDU 30 in accordance with a decoding sequence controlled by sequencer 401. The address information of the coded information is transferred to MMU 50 via the bus 42 and the decoded instruction code are supplied via a bus 413 in common to three queue registers IDQ0, and IDQ1, IDQ2 402, 403 and 404, respectively. Each of IDQ0-2 (402-404) temporarily stores the decoded instruction code on the bus 413 in response to one of corresponding writestrobe signals QSLSTB0-2 applied to a write-enable terminal WE thereof and reads out the stored decoded code in response to one of corresponding readstrobe signals EXQSL0-2 applied to a read-enable terminal RE thereof. These signals QSLSTB0-2 and EXQSL0-2 are controlled by a queue register read/write control circuit 405. Specifically, this control circuit 405 generates sequentially the signal, QSLSTB0-2 one by one in response to an IDQSTB signal, which is generated by the sequencer 401 each time an instruction is decoded, and thus causes IDQ0-2 (402-404) to sequentially store the decoded instruction code from the decoder 400. The circuit 405 further sequentially generate the signals EXQSL0-2 one by one in response to the IDQACK signal from EXU 60 and a corresponding queue ready signal IDQRDY0-2 from a queue ready control circuit 407 and thus causes IDQ0-2 to sequentially transfer the stored code onto the bus 41 coupled to EXU 60. The queue ready control circuit 407 generates one of the IDQRDY0-2 signals in response to the TLENDI signal indicating that the address calculation and translation of operand data necessary for the decoded instruction stored in one of the corresponding one IDQ0-2 (402-404) is completed. Therefore, each of the IDQRDY0-2 signals represents the ready state for execution of the decoded instruction stored in one of the corresponding IDQ0-2 402-404. The IDQRDY0-2 signals are cleared by clear signals VQCLR0-2 from a queue ready clear control circuit 411, respectively. The decoder 400 further produces a CBRA signal indicating that a conditional branch instruction is decoded. In response to this CBRA signal, a branch queue register pointer 406 temporarily stores a location number BRRT0-2 of the queue register (IDQ) that stores the decoded code of the conditional branch instruction. The decoder 400 further produces a FLAGM signal indicating that an instruction now decoded may change the content in PSW 65 of EXU 60. A branch condition unsettled period detector 409 temporarily latches the FLAGM signal and thus indicates a period, during which the branch condition designated by the conditional branch instruction is not settled, by changing an FHZR signal to an active level. In response to the CBRA signal, a branch control signal output circuit 408 is activated. However, this circuit 408 holds both the VCAN and UCAN signals at an invalid level during the active level of the FHZR signal. When the FHZR signal changes to an inactive level, the circuit 408 outputs valid VCAN (branch success) and UCAN (branch failure) signals in response to the TAKEN signal from EXU 60. Since IDU 40 continues to decode an instruction subsequent to the conditional branch instruction or an instruction at a branch address during the unsettled period of the designated branch condition, a queue ready mask control circuit 410 is provided. This circuit 410 masks each of the IDQRDY0-2 signals with one of the corresponding mask control signals INV0-2 and removes the corresponding INV0-2 signals in response to a BREN signal from the circuit 408. The BREN signal indicates that the output circuit 408 outputs valid VCAN and UCAN signals. During the mask state of the IDQRDY signal, the control circuit 405 does not generate the corresponding EXQSL signal, so that the corresponding decoded instruction is not transferred to EXU 60. If the instruction or instructions, which were decoded during the unsettled period of the branch condition, are changed to an instruction or instructions not to be executed due to the branch success or branch failure, the clear circuit 411 detects such instruction(s) by an inverted mask control signals $\overline{INV}$ 0-2 and clears one or more of the corresponding IDQRDY0-2 signals. When the valid VCAN signal is outputted, the queue read/write control circuit 405 fetches the pointer data BRPT0-2 from the pointer 406, whose content indicates the queue register IDR0, 1 or 2 storing the decoded conditional branch instruction, and thus causes the queue register next to the queue register represented by pointer data BRPT0-2 to store a new decoded instruction. The decoded instruction, which was decoded during the unsettled period of the branch condition, is thereby deleted from the queue register.

Figure 3A:
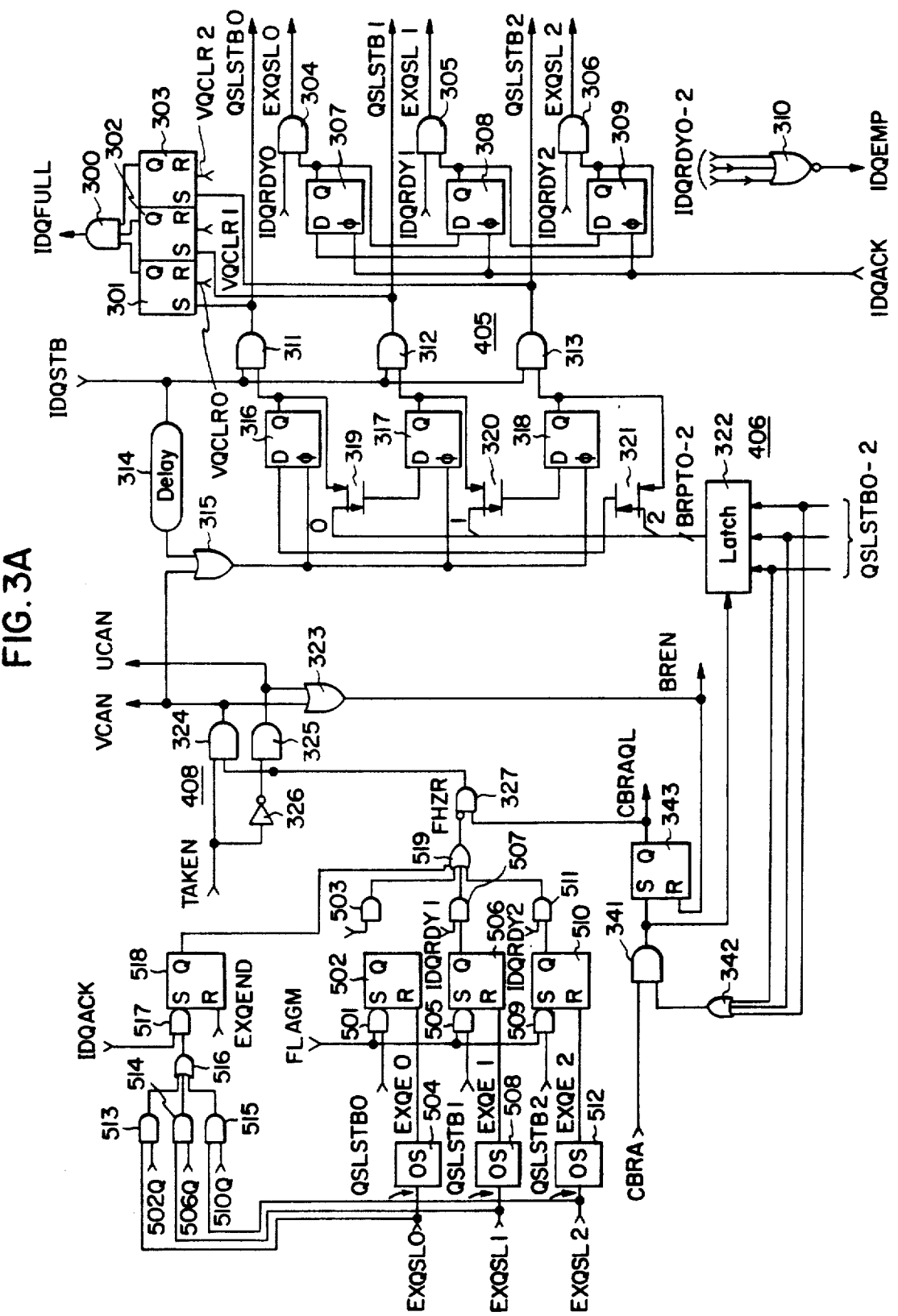
FIGS. 3A and 3B are circuit diagrams representative of blocks shown in FIG. 2.
Figure 3B:
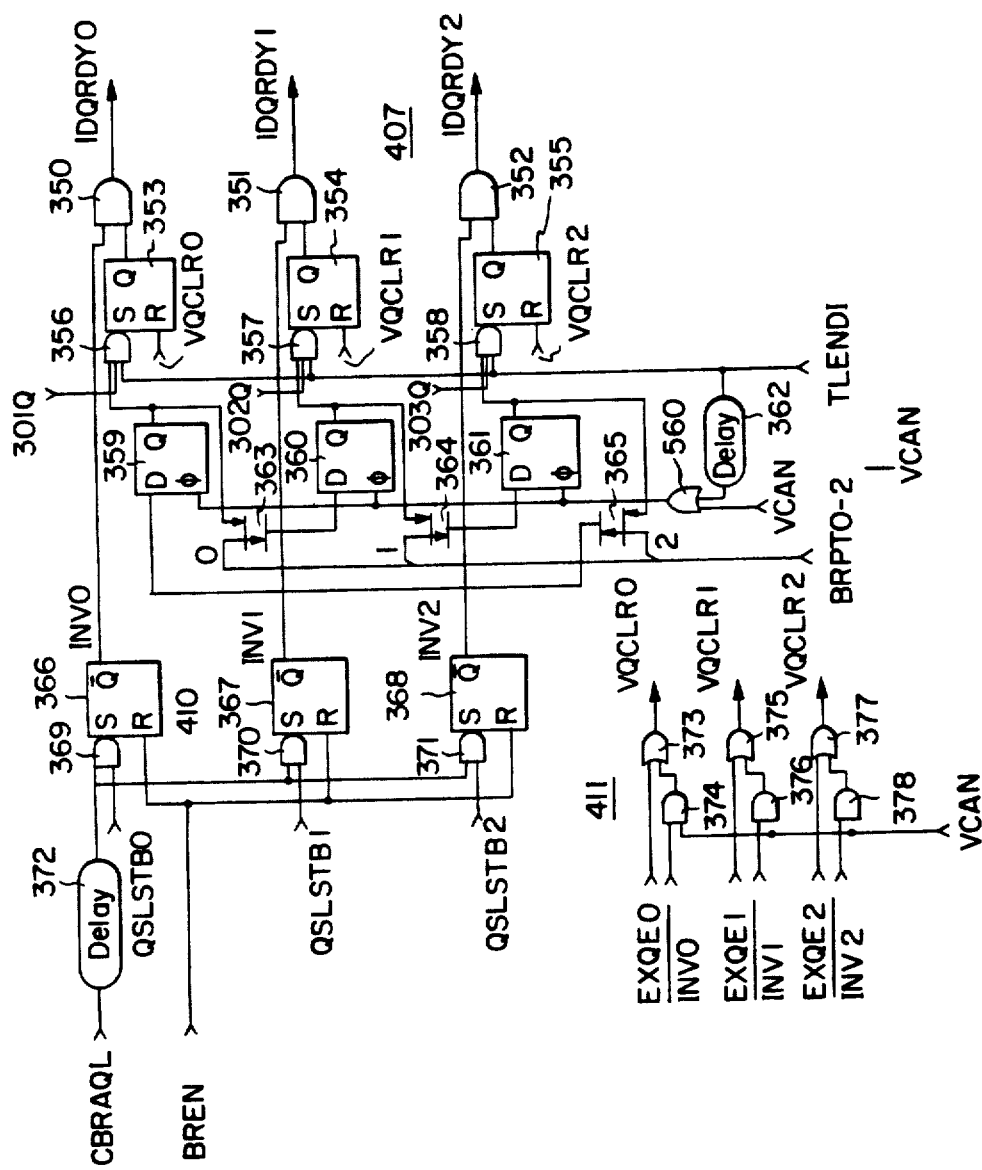

The above-described operations of the respective circuits 405 to 411 are realized by circuit constructions shown in FIGS. 3A and 3B. FIG. 3A shows the circuits 405, 406, 408 and 409 and FIG. 3B shows the circuits 407, 410 and 411 related to the queue ready control.

Figure 4:
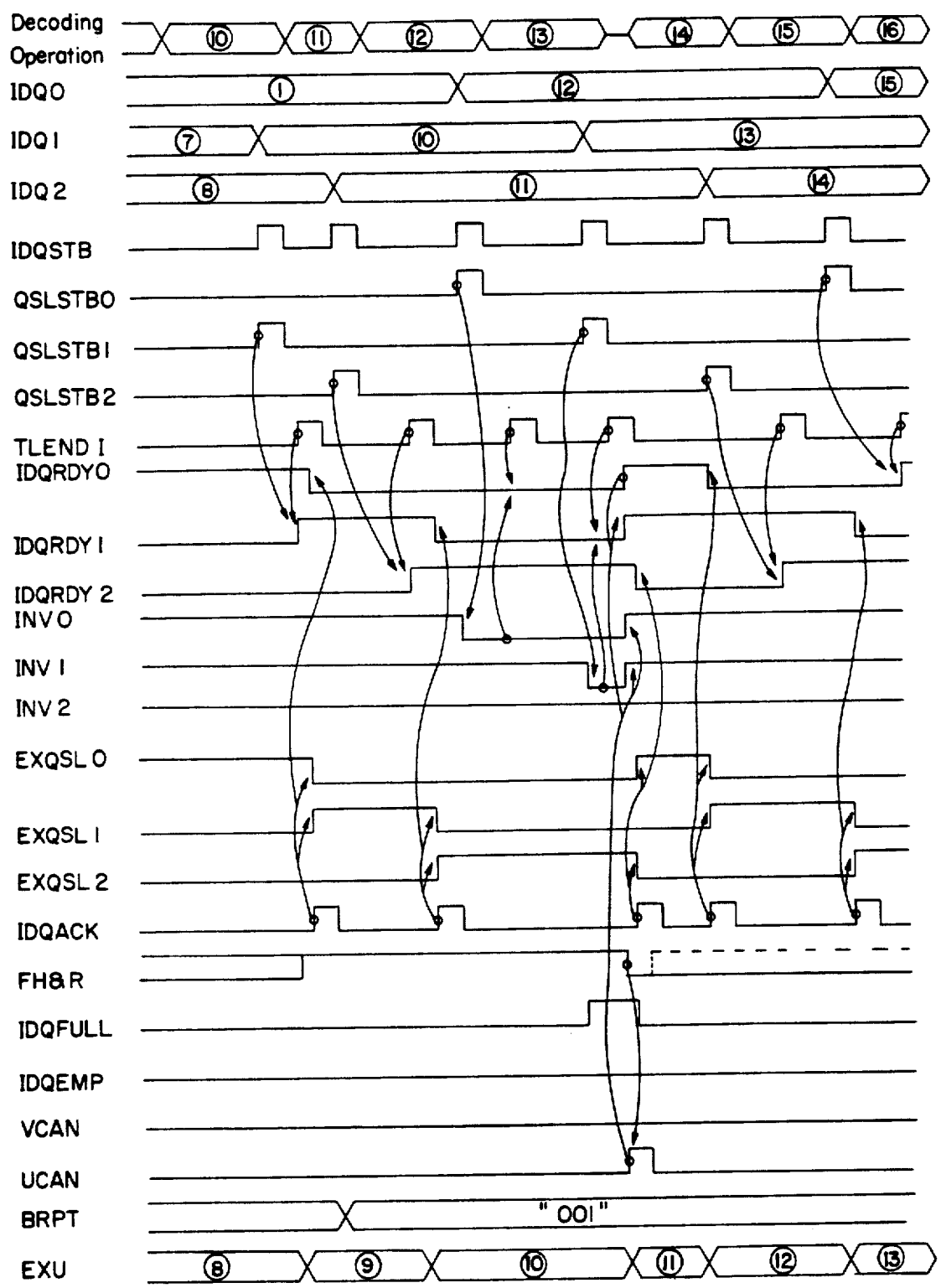
FIGS. 4 and 5 are timing charts representative of operations of IDU shown in FIGS. 2 and 3 for explaining a precedent decoding function.
Figure 5:
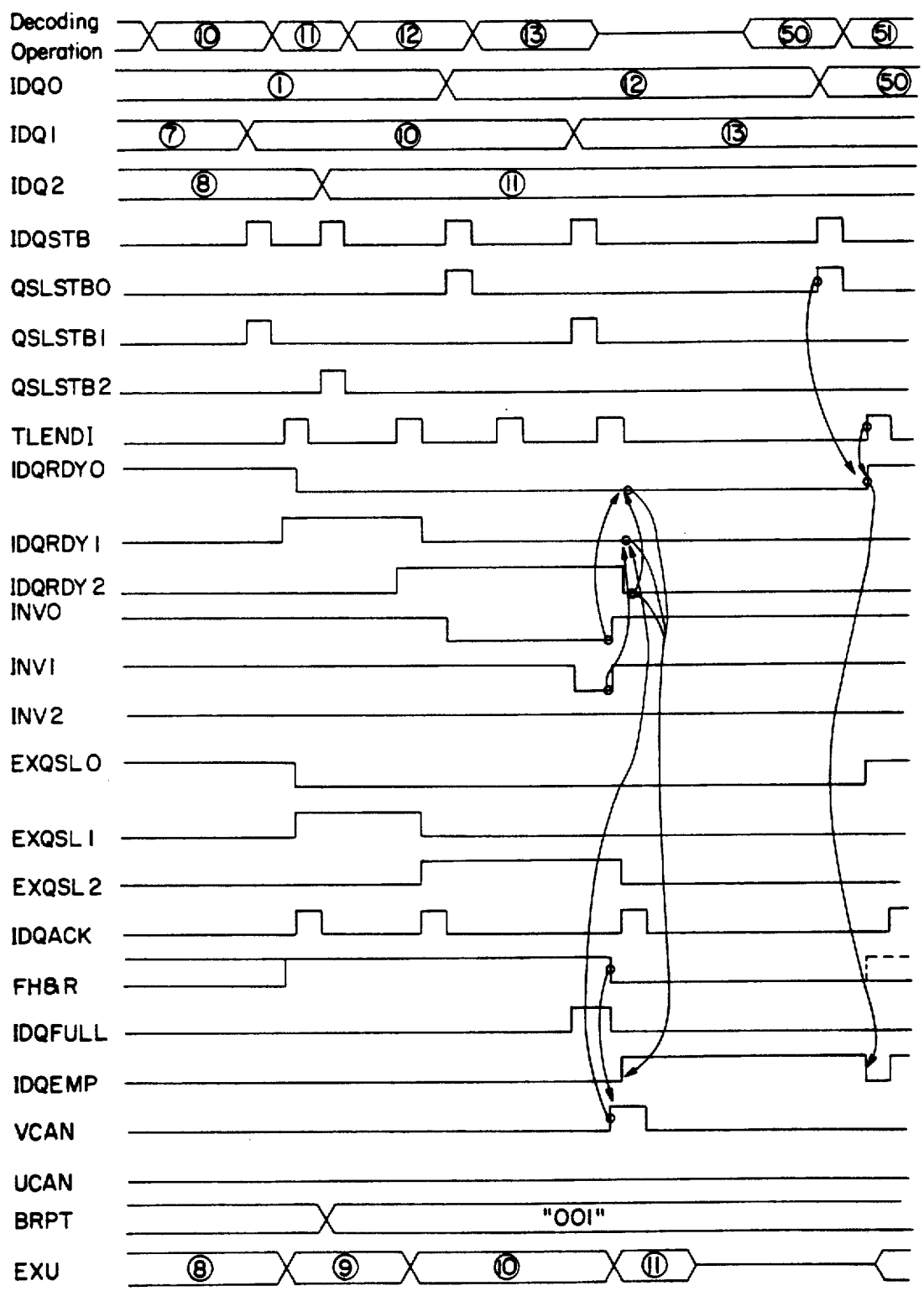

A detailed operation will be described below with reference to FIGS. 1 to 3 and further to timing charts shown in FIGS. 4 and 5. In this embodiment, instructions subsequent to a conditional branch instruction are decoded before the branch condition settlement. Further, FIG. 4 shows the case where the branch condition is not satisfied, i.e. the previously decoded instructions become valid. In contrast, FIG. 5 shows the case where the branch condition is statisfied so that the instruction to be executed next to the conditional branch condition is an instruction stored at a branch address. The previously precedently decoded instructions thereby become invalid.

In the timing chart shown in FIG. 4 first, it is assumed that D-type flip-flops (D-F/Fs) 307, 317 and 360 store "1" at the time the decoder 400 starts to decode and instruction ⑪ before a conditional branch instruction ⑪. At this time, moreover, it is assumed that EXU 60 is executing an instruction ⑧ whose decoded code was stored in IDQ2 404 and IDQ0 402 stored the decode code of an instruction ⑨ between the instructions ⑧ and ⑩. When the decoder 400 completes decoding the instruction ⑪, the sequencer 401 produces the IDQSTB signal, so that an AND gate 312 the produces QSLSTB1 signal. The decoded code of the instruction ⑪ is thereby stored into IDQ1 403. An S-R type flip-flop (SR-F/F) 303 is set. The operand address information is transferred to MMU 50. In response to the delayed IDQSTB signal via a delay circuit 314, each of D-F/Fs 316 to 318 fetches an input at a D-terminal thereof. Although not shown, multiplexers (MPXs) 319–321 are controlled by the VCAN signal and select respectively the Q-outputs of F/Fs 316 to 318 when VCAN signal assumes the inactive level (low level). Accordingly, the Q-output "1" of F/F 317 is transferred to F/F 318, and F/Fs 316 and 317 fetch "0". Since the instruction ⑩ is an arithmetic/logic operation instruction which may change the content of PSW65, the decoder 400 further produces the FLAGM signal, so that SR-F/F 506 is set. When MMU 50 completes the operand address calculation and translation, it produces the TLENDI signal, so that SR-F/F 353 is set. Since SR-F/Fs 366–368 are in a reset state initially, they produce the high-level INV0–2 signals at the respective Q-outputs. Therefore, the IDQRDY1 signal is changed to the active high level to indicate that the instruction ⑩ is read for execution. The active high level of the IDQRDY1 signal opens an AND gate 507 to change the FHZR signal to the high level. If the instruction ⑧ or ⑨ could also change the content of PSW 65, the corresponding F/F 502 or 510 was in the set state, so that the FHZR signal has already assumed the high level. By the delayed TLENDI signal via a delay circuit 362, D-F/Fs 359–361 fetch inputs at D-terminals thereof. Since the MPXs 363–364 are also controlled by the VCAN signal, the Q-output "1" of F/F 360 is fetched by F/F 361 and F/Fs 359 and 360 fetch "0". The IDQRDY1 signal holds the active high level with F/F 354.

The decoder 400 that starts to decode the conditional branch instruction ⑪. During this decoding, EXU 60 completes the execution of the instruction ⑧ and then produces an instruction execution end signal EXQEND to reset SR-F/F 518. Thus, each of SR-F/Fs 502, 506 and 510 stores the data indicating whether or not the decoded instruction stored in one of the corresponding IDQ0-2 402–404 could change the content of PSW 65. The SR-F/F 518 stores the data representing whether or not the instruction being currently executed by EXU 60 could change the content of PSW 65. Then EXU 60 thereafter fetches the decoded instruction transferred onto the bus 41. In the present description, since, the EXQSLO signal assumes the active high level, the decoded code of the instruction ⑨ stored in IDQ0 402 is fetched into EXU 60. EXU 60 produces the IDQACK signal to inform the decoded code being fetched. In response to this signal, the data of F/F 502 indicating whether or not the instruction ⑨ may change the content of PSW 65 is transferred to F/F 518. In further response to the IDQACK signal, Q-output "1" of F/F 307 is fetched into F/F 308 and F/F 307 fetched data "0", so that the IDQRDY0 signal is inverted from the high level to the low level. In response to this inversion, a one-shot pulse generator (OS) 504 generates a one-shot pulse EXQDO to reset F/F 502. From the EXQEO pulse, an OR gate 373 of the queue ready clear control circuit 411 produces the clear signal VQCLRO to reset F/Fs 301 and 353. The IDQRDY signal is thereby changed to the inactive low level. Since F/F 308 fetches data "1" and the IDQRDY1 signal has already assumed the active high level, the EXQSL1 signal takes the active high level to cause IDQ1 (403) to read out the decoded code of the instruction ⑩ onto the bus 41. EXU 60 is executing the instruction ⑨.

In response to the IDQSTB signal indicating the decoding completion of the conditional branch instruction, QSLSTB2 signal is generated, so that the decoded code of the instruction ⑪ is stored into IDQ2 (404). F/F 303 is set and the data "1" is shifted from F/F 318 to F/F 316. The branch condition of the conditional branch instruction ⑪ is delivered via a bus 412 to EXU 60 precedently. The FLAGM signal is not produced (i.e., being held at the low level), so that F/F 510 maintains the reset state. The decoder 400 further produces the CBRA signal due to the decoding of the conditional branch instruction ⑪. In response to CBRA and QSLSTB2 signals, an AND gate 341 supplies a latchenable signal to a latch circuit 322. Thus, the location number of IDQ2 storing the decoded code of the instruction ⑪, i.e. IDQ2="001", is latched into the latch circuit 322. The AND gate 341 further sets SR-F/F 343. Since a signal CBRAQL output by F/F 343 is delayed by a delay circuit 372 and then supplied to AND gates 369–371, SR-F/F 368 is free from the set state. INV2 is thereby held at the high level. While an AND gate 327 is made open by the CBRAQL signal, at least F/F 506 is in the set state and the IDQRDY 1 signal assumes the active high level, so that the FHZR signal from the OR gate 519 is at the high level. The output of AND gate 327 is thereby held at the low level. In response to the TLENDI signal representing the completion of the branch address calculation and translation, SR-F/F 355 is set to change the IDQRDY2 signal to the high level. The data "1" is shifted from F/F 361 to F/F 359.

Since IDU 40 decodes instructions subsequent to the conditional branch instruction ⑪ preceding the branch condition settlement, the decoder 400 starts to decode the instruction ⑫. During this decoding, EXU 60 completes the execution of the instruction ⑨ and resets F/F 518 by the EXQEND signal. EXU 60 further judges whether or not the branch condition previously delivered from the decoder 400 is satisfied with reference to the content of PSW 65 each time the current instruction execution is completed, and then outputs the judging result as the TAKEN signal. However, the FHZR signals take the high level at this time to indicate the branch condition unsettled period, and therefore AND gates 324 and 325 are in the closed staee. Valid VCAn and UCAn signals are thereby outputted. Since the EXQSL1 signal assumes the signal level, EXU 60 fetches the instruction ⑩ and then produces the IDQACK signal. By this signal, the stored data "1" of F/F 506, indicating that the instruction ⑩ may change the content of the PSW 65, is transferred to F/F 518 to maintain the FHZR signal at the high level. Further by the IDQACK signal, the EXQSL1 signal is changed to the low level, so that F/Fs 506, 354 and 302 are reset. F/F 309 fetches the data "1".

In response to the decoding completion of the instruction ⑫, the QSLSTB0 signal is produced to cause IDQ0 (402) to store the decoded code of the instruction ⑫. If this instruction ⑫ could change the content of PSW 65, the FLAGM signal is further produced and thus F/F 502 is set. Since, the IDQRDY0 signal is not yet produced at this time, the AND gate 503 is closed. F/F 302 is set and the data "1" is shifted from F/F 316 to F/F 317. The AND gate 369 is opened by the QSLSTB0 signal and the delayed CBRAQL signal to set F/F 366. The queue mask signal INV0 is thereby changed to the active low level to indicate that the instruction ⑫ was decoded precedently to the branch condition settlement. Accordingly, even when F/F 353 is set in response to the TLENDI signal representing the completion of the operand address calculation and translation for the instruction ⑫, the IDQRDY0 signal is masked to the low level by the INV0 signal and the AND gate 350. Since the IDQRDY0 signal is masked, the content of F/F 502 is also masked by the AND gate 503. That is, the FHZR signal is not influenced by the instruction which was decoded preceding the branch condition settlement. The decoder 400 advances the decoding operation to decode an instruction ⑬, so that the decoded code thereof is stored into IDQ1(403). Similar to the case of the instruction ⑫, the ready signal IDQRDY1 for the instruction ⑬ and the data of F/F 506 are masked. Since all IDQ0-2 (402-404) store the decoded codes of the instructions ⑪ to ⑬ which are yet not executed, an AND gate 300 produces the IDQFULL signal of the active high level. In response to thereto, the sequencer 401 suspends the decoding operation of the decoder 400 and PDU 30 also suspends the transfer of an instruction.

When EXU 60 completes the execution of the instruction ⑩, F/F 518 is reset and thus the FHZR signal is inverted to the low level. Namely, the circuit 409 informs the output circuit 408 of the elapse of the branch condition unsettled period by the low level of the FHZR signal. As a result, AND gates 324 and 325 are opened. At this time, EXU 60 already produces the TAKEN signal representing whether or not the branch condition of the conditional branch instruction ⑪ was satisfied with reference to the content of PSW 65 controlled by the execution of the instruction ⑩. In the present description, since the branch condition is not satisfied, the TAKEN signal assumes the low level.

Accordingly, the output circuit 408 changes the UCAN signal to the high level with holding the VCAN signal at the low level to inform the branch failure. The output BREN of an OR gate 323 receiving the VCAN and UCAN signals resets F/F 343, so that both of the VCAN and UCAN signals are changed to invalid (inactive) level. Further by the BREN signal, F/Fs 366 to 368 are reset to change the mask signals INV0 and INV1 to the inactive high level. Thus, the IDQRDY0 and 1 signals are released from the masked state and changed to the active high level, respectively. The mask state of F/F 502 and 506 are also removed. If at least one of the instructions ⑫ and ⑬ could change the content of PSW 65, the FHZR signal is again changed to the high level. Thus, the instructions ⑫ and ⑬ are brought into a valid state and have a ready state for execution. Since the EXQSL2 signal is produced at the point in time of the execution completion of the instruction ⑩, EXU 60 fetches the instruction ⑪ and then returns the IDQACK signal. EXQSL2 is thereby inverted to the low level and thus F/F 355 is reset to change the IDQRDY2 signal to the low level. Moreover, F/F 303 is reset to change the IDQFULL signal to the low level, so that IDU 40 resumes the decoding operation to decode an instruction ⑭. Furthermore, since the data "1" is shifted from F/F 309 to F/F 307, the EXQSL0 signal changes to the high level to cause IDQ0 (402) to transfer the decoded code of the instruction ⑫ onto the bus 41. Although EXU 60 fetches the conditional branch instruction ⑪, since this instruction has already substantially been executed, EXU 60 executes the instruction ⑪ as a no-operation instruction. That is, any states and conditions of EXU 60 do not change. EXU 60 thereafter fetches the instruction ⑫ and starts to execute it.

As apparent from the above description, even if the conditional branch instruction ⑪ is decoded, PDU30, IDU40 and MMU50 continue to performing their respective subsequent operations in the pipeline flow. Moreover, the respective operations preceding the branch condition settlement become valid in response to the branch failure, so that the pipeline processing flow of the respective units are not stopped substantially.

On the other hand, in cases where the branch condition of the conditional branch instruction 11 is satisfied, the VCAN (branch success) signal is changed to the active high level, as shown in FIG. 5, so that AND gates 374 and 376 of the clear control circuit 411 produces the clear signals VQLCR0 and 1 to reset F/Fs 354 and 355. Accordingly, even when the INV0 and 1 signals change to the high level to release the mask state, IDQRDY0 and 1 signals are maintain at the low level. The decoded instructions ⑫ and ⑬ thus become invalid and is not executed. F/Fs 301 and 302 are also reset to change IDQFULL signal to the low level. By VCAN signal, BIU 20 and PDU 30 are commanded to fetch an instruction at the branch address. Further, the VCAN signal supplies a clock signal via OR gates 315 and 560 to F/Fs 316 to 318 and 359 to 360 and commands MPXs 319 to 321 and 364 to 366 to select the pointer data "001" from the latch circuit 322. As a result, the data "1" is fetched into F/Fs 316 and 359, whereas F/Fs 317, 318, 360 and 361 fetch data "0". Thus, IDQ0(402), which is next to IDQ2(404) storing the conditional branch instruction ⑪, is designated as a queue register to store the decoded code of the instruction at the branch address. The instruction stream to be transferred to EXU 60 is thereby not disturbed. In response to the IDQACK signal indicating that EXU 60 fetched the instruction ⑪, F/F 355 is reset to change IDQRDY2 to the low level. For this reason, all the IDQRDY0-2 signals assume the low level to cause a NOR gate 310 to produce the IDQEMP signal at the active high level. That is, EXU 60 is informed of the information indicating that no one of IDQ0-2 (402-404) store the decoded code of an instruction having an execution ready state. In response thereto, EXU 60 stops fetching the decoded code from IDU 40 and thus suspends the program execution. An error in operation of EXU 60 is thereby prevented. An instruction ㊾ at the branch address is thereafter transferred to IDU 40 from PDU 30 and decoded by IDU 40. The decoded code of the instruction ㊾ is stored into IDQ0(402). When the operand address calculation and translation for the instruction ㊾ is completed, the IDQRDY0 signal changes to the active high level and the IDQEMP signal is inverted to the low level. EXU 60 thereby resumes operation and fetches and executes the decoded code of the instruction ㊾.

Thus, in the case of branch success, although the decoding operation and address calculation and translation operation for the instructions ⑫ and ⑬ becomes invalid, the pipeline processing flow is not stopped until the branch condition is settled. Since the address calculation and translation of the branch address has already been completed, PDU 30 can be constructed so as to prefetch not only instructions ⑫ to ⑭ but also the instructions ㊾ and ㊶. In this case, PDU 30 can transfer the instructions ㊾ and 51 to IDU 40 immediately in response to the VCAN, branch success signal. The stop of the pipeline flow after the production of VCAN signal is suppressed at a minimum. In FIGS. 4 and 5, when the instruction ⑩ does not change the content of PSW 65 and the instruction ⑨ may change the content of PSW 65, the level of the TAKEN signal is settled at the time of completion of the instruction ⑨ and thus valid VCAN and UCAN signals are produced.

It is apparent that the detailed circuit construction shown in FIGS. 3A and 3B for the circuits 405 to 411 can be modified and changed for realizing the substantially similar functions and operations thereof.

Figure 6:
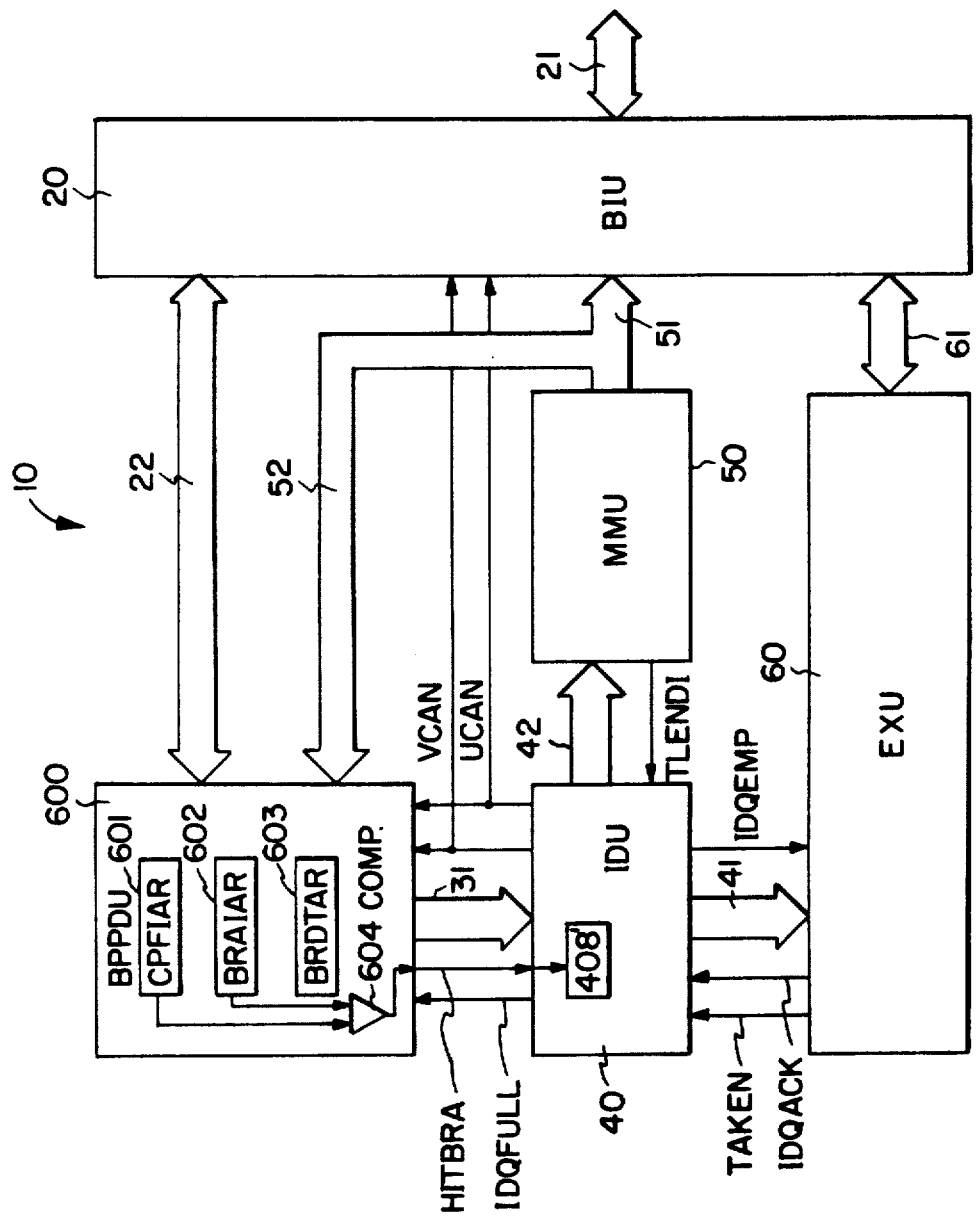
FIG. 6 is a block diagram representative of another embodiment of the present invention.

Turning to FIG. 6, there is shown a microprocessor according to another embodiment of the present invention, wherein the same constituents as those shown in FIG. 1 are denoted by the same reference numerals. In this embodiment, a prefetch/predecode/branch-predict unit (BPPDU) 600 is employed in place of PDU 30 of FIG. 1. This unit 600 performs a branch-predict operation in addition to the instruction prefetch and predecoding operations. For the branch-predict operation, BPPDU 600 includes a register (CPFIAR) 601 for storing an address of an instruction currently being prefetched, a register (BRAIAR) 602 for storing an address of a conditional branch address (called hereinafter "branch source address), a register (BRDTAR) 603 for storing a branch destination address designated by the conditional branch instruction and a comparator (COMP) 604. The content of CPFIAR 601 is ordinarily updated by byte numbers of the prefetched instruction. BRAIAR 602 stores the branch source address into which the conditional branch instruction previously prefetched and executed is stored. Accordingly, when that conditional branch instruction is again prefetched, COMP 604 produces a branch-predict hit signal HITBRA. BPPDU 600 thus prefetches the instruction at the branch destination address by the use of BRDTAR 603. not instructions subsequent to the conditional branch instruction. The HITBRA signal is supplied to an output circuit 408' of IDU 40, this circuit 408' being slightly different from the circuit 408 of FIG. 3A, as shown in FIG. 7.

More specifically, the HITBRA signal sets SR-F/F 701. The Q-output thereof controls a multiplexer (MPX) 702. When the Q-output of F/F 701 assumes the high level, MPX 702 output the outputs of AND gates 324 and 325 as UCAN and VCAN signals, respectively. On the other hand, in case of the low level output of F/F 701, the outputs of AND gates 324 and 325 are derived as VCAN and UCAN signals, respectively.

Figure 7:
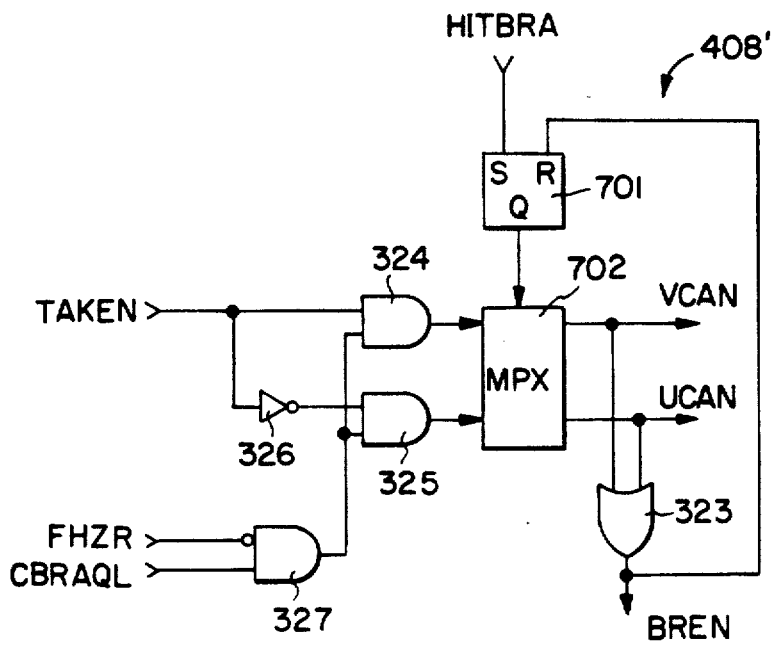
FIG. 7 is a circuit diagram representative of an output circuit 408' shown in FIG. 6.

The operation of the microprocessor shown in FIGS. 6 and 7 is basically the same as that shown in FIGS. 4 and 5 except that the instructions transferred after the prefetch of the conditional branch instruction may be different from those shown in FIGS. 4 and 5. More specifically, when the HITBRA signal is produced by prefetching the conditional branch instruction ⑪, F/F 701 is set and BPPDU 600 prefetches the instructions 50 at the branch address and instructions ㊶, ㊷ and so forth subsequent to ㊾. Accordingly, the instruction stream to be decoded indicated as "Decoding Operation" in FIGS. 4 and 5 is ⑪ → ㊾ → ㊶ → . . . . The branch condition of the instruction ⑪ is settled at the end of the execution of the instruction ⑩. If the branch condition is satisfied, the outputs of AND gates 324 and 325 are changed to the high level and the low level, respectively. Since F/F 701 is set to output the high level at Q-output thereof, the output of AND gate 324 is transferred as the UCAN signal. Therefore, the decoded code of the instructions ㊾ and ㊶ stored in IDQ0 and 1 (402 and 403) becomes valid and is then executed by EXU 60. On the other hand, in cases where the branch condition is not satisfied, since VCAN signal assumes the active high level, the instructions ㊶ and ㊷ become invalid. The prefetch and predecode operations for instructions ⑫, ⑬ and so forth are thereby performed. When BPPDU 600 prefetches the conditional branch instruction ⑪ with the miss-hit of the branch predict, the operations shown in FIGS. 4 and 5 are performed.

Figure 8:
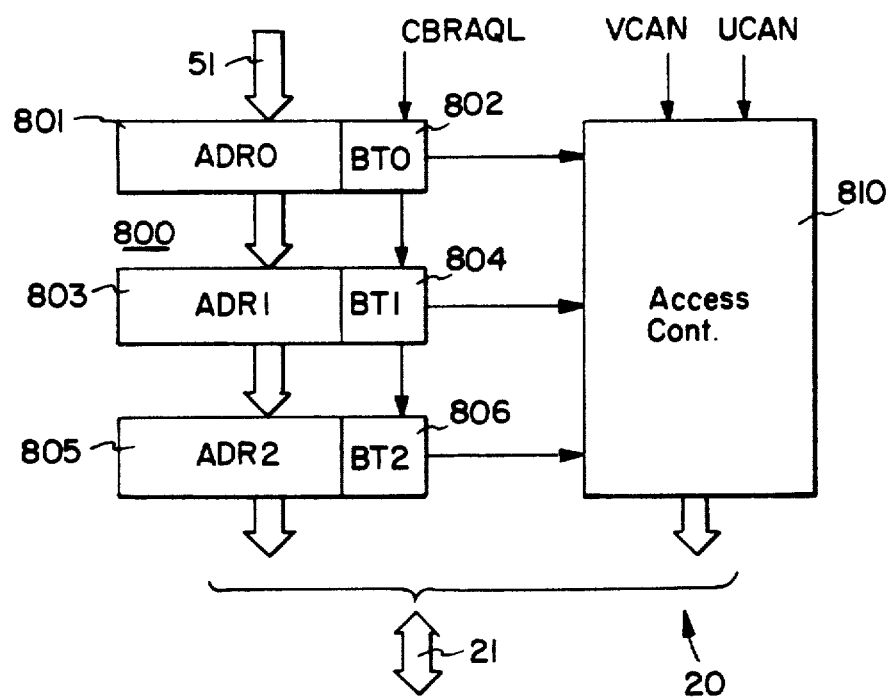
FIG. 8 is a block diagram representative of a main part of a bus interface unit (BIU) shown in FIGS. 1 or 6.

In the above embodiments, the operand data access for instructions which was decoded preceding the branch condition settlement is required to be made after the branch condition settlement. For this purpose, BIU 20 includes an access information storage 800, as shown in FIG. 8. This storage 800 includes three buffer registers ADR0(801), ADR1(803), ADR2(805) of a queue structure, each of which temporarily stores an operand address. Further, ADR0-2 (801, 803 and 805) are accompanied by tag flags BT0(802), BT1(804), BT2(805), respectively, supplied with the CBRAQL signal (FIG. 3). Accordingly, the addresses of operands for the instruction which are decoded during the branch condition unsettled period are temporarily stored in the storage 800 together with the tag information representing that unsettled period. An access controller 810 receives the contents of BT0-2 (802, 804 and 805) and suspends the operand access if the tag information is stored therein. When the VCAN signal is produced, the controller 810 invalidates the contents of the storage 800. On the other hand, in the case of the UCAN signal, the operand access is made by use of the storage 800.

Each of ADR0-2 (801, 803 and 805) can be further added with access priority data, respectively. In this case, the operand access is started from the register ADR having the highest priority in response to the UCAN signal.

The present invention is not limited to the above embodiments, but may be modified and changed without departing from the scope and spirit of the invention.

What is claimed is:

1. An apparatus comprising:
   a decoder for decoding an instruction supplied thereto and producing a decoded instruction;
   storage means for temporarily storing said decoded instruction;
   means for producing an execution ready signal when said decoded instruction stored in said storage means is brought into a ready state for execution;
   means responsive to said execution ready signal for reading out said decoded instruction from said storage means as a read-out decoded instruction;
   an execution unit for receiving and executing the read-out decoded instruction;
   means responsive to decoding of a conditional branch instruction for masking the execution ready signal for at least one instruction which is decoded by said decoder and stored in said storage means during an unsettled period of a branch condition of said conditional branch instruction to thereby prevent a decoded instruction of said at least one instruction from being read out form said storage means to said execution unit; and
   means activated after said unsettled period for performing one of (1) removing said masking of the execution ready signal when said branch condition indicates one of branch success and branch failure and (2) changing the execution ready signal to an invalid state when said branch condition indicates the other of said branch success and said branch failure.

2. An apparatus comprising:
   a decoder for decoding an instruction and producing a decoded instruction;
   a plurality of registers;
   means for sequentially selecting one of said plurality of registers and for storing said decoded instruction into the selected one of said registers;
   means for producing a plurality of ready signals corresponding to said registers, each of said ready signals taking and active level when the decoded instruction stored in the corresponding register is brought into a ready state for execution;
   means for sequentially selecting one of said registers and reading out the decoded instruction from said one of said registers when the corresponding ready signal takes said active level, said decoder further producing a first control signal when said decoder decodes a conditional branch instruction;
   means for producing a second control signal when a branch condition of said conditional branch instruction is settled;
   means responsive to said first control signal for masking the ready signal for at least one instruction which is decoded by said decoder and stored in one of said plurality of registers until said second control signal is produced to thereby prevent the decoded instruction of said at least one instruction from being read out of the corresponding register, the masked ready signal taking an inactive level;
   means responsive to the settled branch condition of said conditional branch instruction of generating a branch signal, said branch signal indicating either branch success or branch failure; and
   means responsive to said branch signal for releasing said masking of the ready signal or for holding the masked ready signal at said inactive level in accordance with the indicated one of said branch success and said branch failure.

3. An apparatus comprising:
   decoder means for decoding st least one instruction and outputting a decoded instruction;
   storage means for temporarily storing said decoded instruction as a stored decoded instruction;
   means for producing an execution ready signal whenever said stored decoded instruction means responsive to said execution;
   storage indicating means responsive to said execution ready signal for indicating which stored decoded instruction can be read out of said storage means as an indicated decoded instruction;
   an execution unit for receiving and executing said indicated decoded instruction;
   masking means responsive whenever said instruction is a branch instruction for masking said execution ready signal during a period of time when a branch condition of said branch instruction is unsettled to thereby prevent the stored decoded instruction of at least one instruction following said branch instruction from being read out of said storage means; and
   means for performing one of (1) removing said masking of the execution ready signal whenever said branch condition indicates one of branch success and branch failure and (2) changing the execution ready signal to an invalid state whenever said branch condition indicates the other of said branch success and said branch failure.

4. An apparatus as claimed in claim 3, wherein said storage means comprises a plurality of registers.

5. An apparatus as claimed in claim 3, wherein said decoder means outputs address information corresponding to said instruction.

6. An apparatus as claimed in claim 3, wherein said execution unit outputs a taken signal said taken signal indicating that said execution unit has a result to a branch condition.

7. An apparatus as claimed in claim 3 further including a branch success/failure output circuit, said branch success/failure output circuit being activated whenever said instruction is a branch instruction, and outputting one of a valid branch success signal and a valid branch failure signal.

8. An apparatus comprising:
   decoder means for decoding at least one instruction and outputting a decoded instruction;
   a plurality of registers each temporarily storing said decoded instruction as a stored decoded instruction;
   means for producing an execution ready signal whenever said stored decoded instruction is ready for execution:
   register indicating means responsive to said ready signal for indicating which stored decoded instruction can be read out of one of said registers as an indicated decoded instruction;
   an execution unit for receiving and executing said indicated decoded instruction;

masking means responsive to decoding of a conditional branch instruction for masking said execution ready signal during a period of time when a branch condition of said conditional branch instruction is unsettled;

means responsive to decoding of said conditional branch instruction for temporarily storing a location number corresponding to one of said registers holding said conditional branch instruction as a stored location number;

means for performing one of (1) removing said masking of the execution ready signal when the settled branch condition indicates one of branch success and branch failure and (2) changing the execution ready signal to an invalid state when the settled branch condition indicates the other of said branch success and said branch failure; and means responsive to said stored location number for designating one of said registers into which a decoded instruction of an instruction to be executed after said conditional branch instruction is to be stored when the execution ready signal is changed to said invalid state.

9. A method comprising the steps of:

decoding instructions in a decoding unit and outputting decoded instructions;

storing said decoded instructions in a storage unit as stored decoded instructions;

producing an execution ready signal whenever said stored decoded instruction is brought into a ready state;

indicating which stored decoded instruction can be read out of said storage unit as an indicated decoded instruction;

receiving and executing said indicated decoded instruction by an execution unit;

masking said execution ready signal during a period of time when a branch instruction is decoded and a branch condition of said branch instruction is unsettled to thereby prevent a stored decoded instruction of at least one instruction decoded after said branch instruction from being read out of said storage unit; and performing one of (1) removing said masking of the execution ready signal when said branch condition indicates one of branch success and branch failure, and (2) changing the execution ready signal to an invalid state when said branch condition indicates the other of said branch success and said branch failure.

10. A method as claimed in claim 9, wherein said storing step includes storing said decoded instructions in a plurality of registers.

11. A method as claimed in claim 9, wherein said decoding step further includes outputting address information corresponding to said instruction.

12. A method as claimed in 9 wherein said receiving and executing step further includes outputting a taken signal, said taken signal indicating that said execution unit has a result to a branch condition.

13. A method as claimed in claim 9, wherein said decoding step further includes a branch success/failure output circuit, said branch success/failure output circuit being activated by decoding of said branch instruction, and outputting one of a valid branch success signal and a valid branch failure signal.

14. A method comprising the steps of:

decoding instructions in a decoding unit and outputting decoded instructions;

storing said decoded instructions in a plurality of registers as stored decoded instructions;

producing an execution ready signal whenever said stored decoded instruction is brought into a ready state;

indicating which stored decoded instruction can be read out of one of said registers as an indicated decoded instruction;

receiving and executing said indicated decoded instruction by an execution unit;

masking said execution ready signal during a period of time when a conditional branch instruction is decoded and a branch condition of said conditional branch instruction is unsettled;

storing a location number corresponding to one of said registers holding said conditional branch instruction as a stored location number;

performing one of (1) removing said masking of the execution ready signal when said branch condition indicates one of branch success and branch failure, and (2) changing the execution ready signal to an invalid state when said branch condition indicates the other of said branch success and said branch failure; and designating, in response to said stored location number, one of said registers into which a decoded instruction of an instruction to be executed after said conditional branch instruction is to be stored when the execution ready signal is changed to said invalid state.

* * * * *